April 21, 1953 F. H. BARKAU 2,635,373

TELEVISION PROMPTING APPARATUS

Filed April 21, 1949 3 Sheets-Sheet 1

INVENTOR.

Fred H. Barkau

By Fraser, Myers & Manley

ATTORNEYS.

April 21, 1953 F. H. BARKAU 2,635,373

TELEVISION PROMPTING APPARATUS

Filed April 21, 1949 3 Sheets-Sheet 2

INVENTOR.
Fred H. Barkau
BY
Fraser, Myers & Manley
ATTORNEYS.

INVENTOR.
Fred H. Barkau
BY
Fraser, Myers & Manley
ATTORNEYS.

Patented Apr. 21, 1953 2,635,373

UNITED STATES PATENT OFFICE 2,635,373

TELEVISION PROMPTING APPARATUS

Fred H. Barkau, New York, N. Y., assignor to Teleprompter Corporation, New York, N. Y., a corporation of New York Application April 21, 1949, Serial No. 88,866

3 Claims. (Cl. 40—53)

My present invention relates to apparatus for use out of range of the cameras in a television or motion picture studio for prompting or continuously presenting to the performers' view the running script of the dialogue or narrative being telecast or filmed.

The televising and broadcasting of a play or the like usually requires several weeks of rehearsing, since the participants must memorize their lines as the reading of script held in the hand, or voice prompting from the wings of the studio cannot be resorted to. Moreover, the performers must also make certain as to the time consumed in reciting their lines so that the performance will be completed within a definite program period. The rehearsals require the presence of the performers, directors, the studio personnel and the use of the studio and hence greatly increase the production cost of television broadcasts.

Accordingly, an object of the present invention is to substantially reduce the cost of presenting television broadcasts. A further object is to provide apparatus which will present a running script of the dialogue or narrative visible to the performers from whatever position they occupy in the studio, yet out of view of the televising cameras. A still further object is to provide such apparatus which can be operated by remote control to selectively run the script continuously forward at a predetermined speed or intermittently depending on the voice dialogue of the performers, and also to reverse the movement of the script for the purpose of rewinding the same or making corrections thereon during rehearsals. A still further object is to provide a plurality of such apparatus and means for their simultaneous remote control. A still further object is to provide such apparatus which may be projected onto a screen and still retain the features of selective remote control above set forth.

The foregoing and other objects of my invention not specifically set forth and the manner and means by which they are realized will be better understood from the detailed description which follows when considered in connection with the accompanying drawings, wherein.

Figure 1:
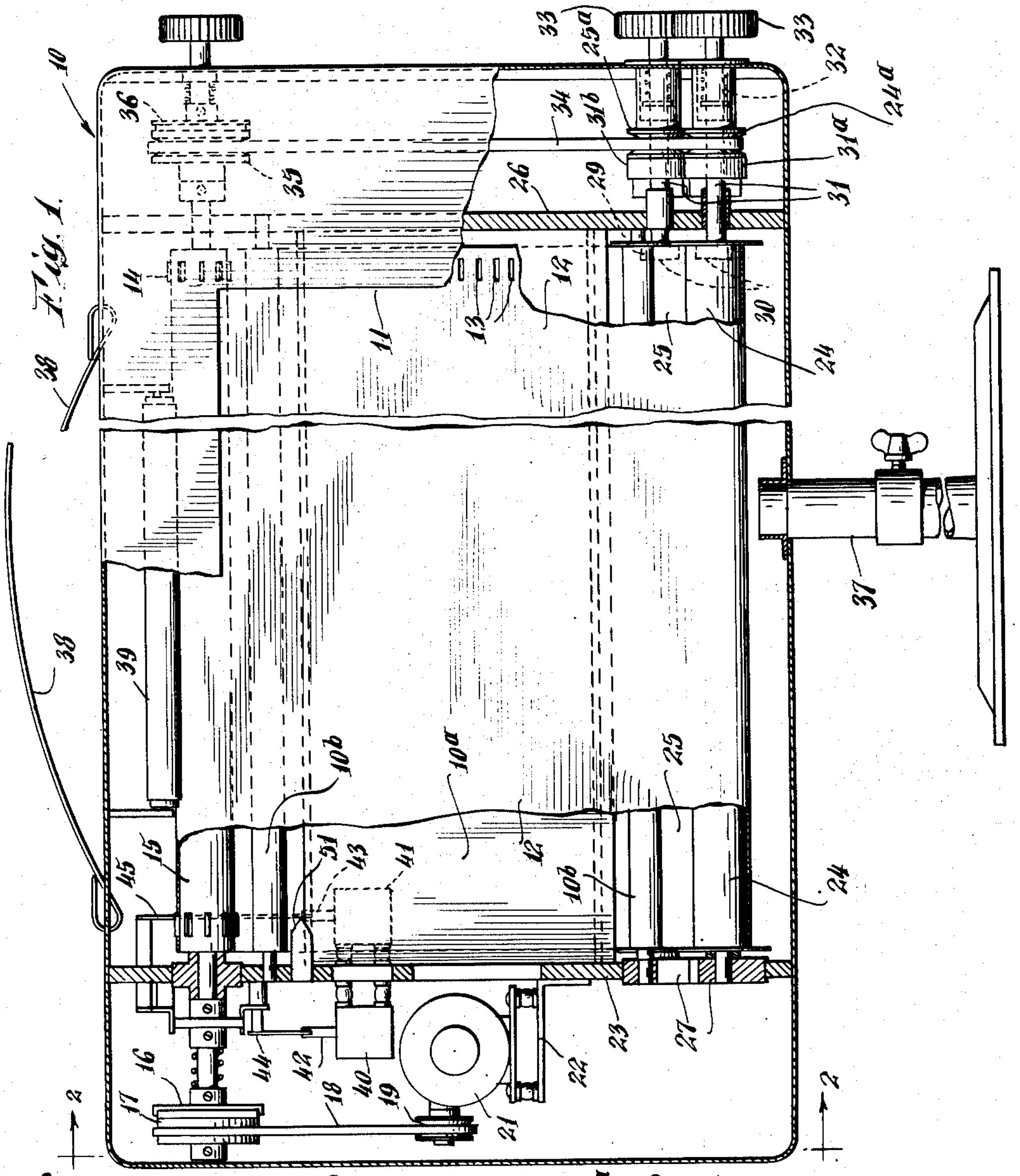
Figure 1 is a front elevation of an apparatus embodying my invention, parts thereof being broken away to better illustrate constructional details thereof.
Figure 2:
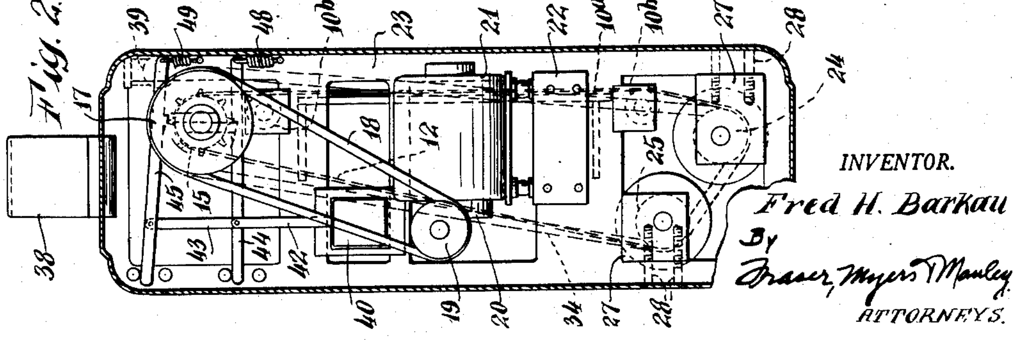
Fig. 2 is a section taken substantially along the plane of the line 2—2 of Fig. 1.

Referring first to Figs. 1 and 2 of the drawings, the apparatus comprises a substantially rectangular casing 10 having a sight opening 11 in the front face thereof past which strip material 12 containing intelligence is adapted to be positively moved in either direction, either continuously or intermittently, as will be hereinafter more fully described. The strip material adjacent its edge portions is formed with equally spaced openings 13 which are adapted to engage over teeth 14 on a roller 15 mounted within the casing, preferably adjacent the top thereof, the said roller being adapted to be driven through a friction clutch 16, 17, the member 17 of which is a pulley adapted to be driven by a belt 18 from motor driven means 19 of a speed reducer 20 which, in turn, is operated by an electric motor 21 mounted on a bracket 22 supported on an intermediate upright wall 23 within the casing 10. The opposite ends of the strip material 12 are detachably secured in any preferred manner to a pair of rolls 24, 25 which are removably supported in the casing 10 by having one end thereof mounted in bearings 27 which are held in the intermediate wall 23 by screws 28 and having at their other ends recesses 29 in which engage lugs 30. To render said rolls removable from the casing, the lugs 30 are carried by stub shafts 31 which are urged into engaging position by springs 32 and said stub shafts are movable to permit disengagement of the rolls by knobs 33. Each of the stub shafts 31 is provided with a unidirectional clutch 31*a* of a character such as to positively drive the respective rolls 24, 25 when they are acting as wind-up rolls and to permit free rotation of said rolls when they act as payout rolls. The rolls 24 and 25 are driven by a common belt 34 engaging over pulleys 24*a* and 25*a* mounted on stub shafts 31, said belt being trained over a pulley 35 mounted on the shaft of the roller 15 and driven by said pulley through the medium of a friction clutch 36. The strip material moves over a backing plate 10*a* and moves over guide rollers 10*b*. The frame 10 may be suitably mounted upon a telescoping standard 37 when the device is to be supported on the floor or upon a base support, and with a strap 38 when the device is to be suspended. For illuminating the face of the strip material 12 as it moves past the sight opening 11 there is provided suitable illuminating means 39.

For selectively controlling the movement of the strip material past the sight opening while the motor 21 is running, I provide novel means for controlling rotation of the roller 15. These means, as herein shown, consist of a pair of solenoids 40 and 41 having movable core elements 42 and 43, respectively, which, in turn, have pivotally mounted to the free end thereof levers or pawls 44 and 45, respectively pivotally supported intermediate their ends, the lever 44 being provided with a detent recess 46 and the lever 45 being provided with a projection 47. The levers 44 and 45 are biased by springs 48 and 49, respectively, so that normally when the solenoids are not energized the detent 46 will engage a stud 50 extending radially from the shaft of the roller 15 and the projection 47 will be clear of the end of a circumferentially spaced radial stud 50*a*. When the solenoid control levers are in the positions shown in Fig. 3, the roller 15 will be held against rotation notwithstanding that the motor 21 is running and the pulley 17 of the clutch device 16, 17 is rotating. Preferably the roller 15 has a diameter such that a half revolution thereof will move the strip material across the sight opening a distance equal to the space between two adjacent lines of script. For indicating to the performers the line of script corresponding to the dialogue I provide a pointer or index 51.

Normally in the operation of the device the strip material will move upwardly under the control of the operator to be synchronous with the dialogue or spoken lines of the performer or performers. However, during rehearsals it may be desirable to move the strip material step by step so that the script thereon may be read and the sequence thereof rendered familiar to the performer, or the strip material may have to be reversely moved where a certain part is to be gone over or re-acted. Also, after the performers have familiarized themselves with the script and the performance is ready to be presented for telecast, it may be found that parts thereof have to be deleted to bring the performance within the allotted time of the program. Also, after final rehearsal and during the course of the actual televising of the performance, it may be necessary to slow down the movement of the strip material, and all of this can be accomplished by remote control through manually operable switches whereby the solenoids may be selectively energized or deenergized. By the same token, where a plurality of the devices are disposed at various vantage points in a television studio it may be necessary to simultaneously operate all of said devices as well as one of the devices located in the control room. For accomplishing this, I have provided an electrical system of controls forming a control unit which may be located remote from the display units or devices which unit I have diagrammatically shown at the dash line box 51′ in Fig. 3 applicable for controlling three viewing units.

Figure 3:
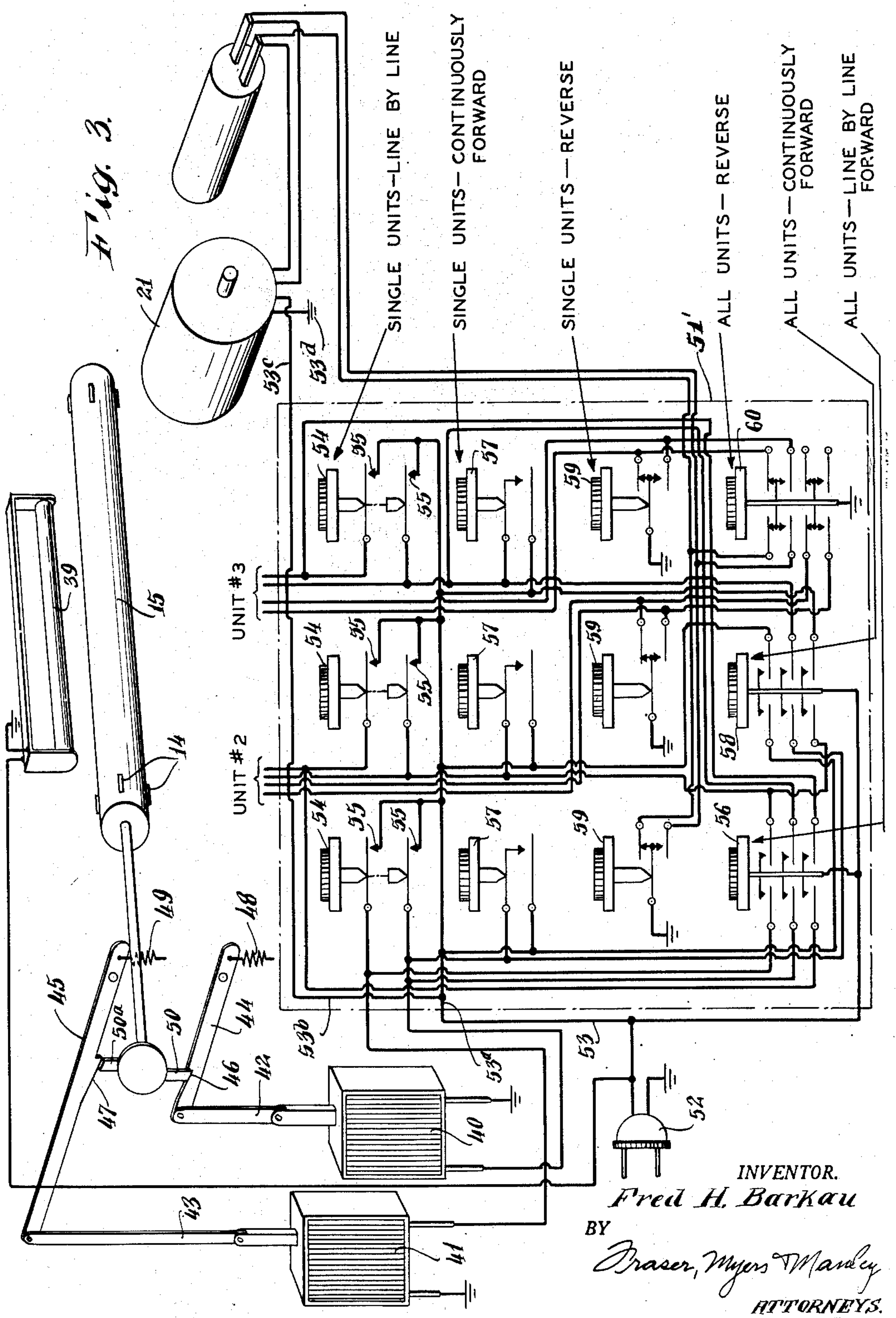
Fig. 3 shows a schematic diagram of the electrical wiring connections for control of the apparatus.

In the electrical installation of the embodiment shown in Figs. 1–3 the motor 21 is of the capacitator type and receives its current from a suitable outlet (not shown) through a plug 52 through the wiring 53, 53*a*, 53*b* and 53*c*, and back through a ground 53*d*, and normally is adapted to rotate the roller 15 in a counterclockwise direction. If it is desired to advance the script material line by line on any one of the units, the corresponding button or switch 54 is depressed, whereupon contact is simultaneously made at the points 55 associated with that button. This closes the electric circuit through each of the solenoids 40 and 41 of the unit in question. This energizes these solenoids and causes their core elements 42 and 43 to move downwardly and thereby disengage the detent 46 from the stud 50 and permit a half revolution of the roller 15 in a counterclockwise direction. Upon completion of such half revolution, the stud 50 will be engaged by the projection 47 and the roller will stop. To advance the roller another half revolution it is necessary to break the circuit through the solenoids by releasing the button 54, thus restoring the parts to the position shown in Fig. 3. To advance the roller through yet another half revolution it is necessary to then again depress the proper button 54, and so on. If it is desired to advance all the units forward line by line the button 56 is depressed, which will simultaneously close the circuits through the solenoids of each unit, and if it is desired to continue such line by line forward movement, the button 56 must be released and again depressed for each line movement. To advance any single unit continuously forward, the button 57 controlling the particular unit, upon being depressed, will energize solenoid 40 of said unit, which will disengage the detent 46 from the stud 50 without affecting the disengaged relation of the projection 47, whereupon the roller 15 is free to rotate continuously in a counterclockwise direction until the button 57 is released. By the same token, where it is desired to operate all units continuously forward, the button 58 is depressed, whereupon the circuits through the solenoids 40 of each of the units will be energized to permit continuous forward rotation of the roller 15 of the respective units. Should it be desired to reverse the direction of movement of the strip material through any unit for rewinding the strip or during rehearsal or for making a correction or deletion in the script, the button or switch 59 corresponding to the unit it is desired to operate upon being depressed and so held will cause the roller 15 to rotate in a clockwise direction. The extent to which such rewinding will take place will be governed by the period during which the button is held down. When it is desired to reverse all units simultaneously the button 60, upon being depressed and during the period it is so held, will accomplish this. Of course all the buttons or switches 54 to 60 may be arranged on a single panel or control board located at any vantage point, for example, in a control room out of the range of the cameras.

Figures 4, 5:
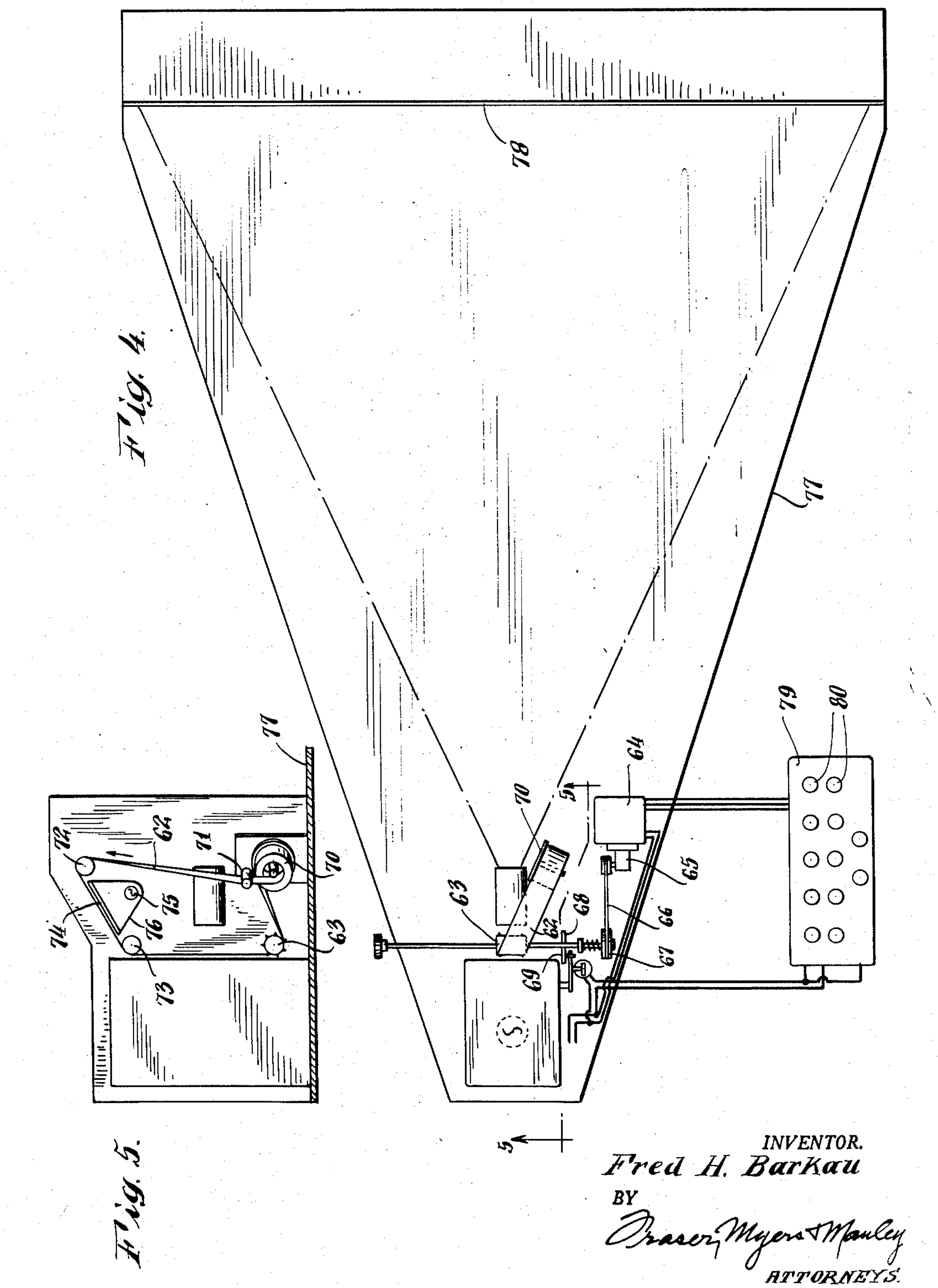
Fig. 4 is a top plan view of another embodiment of my invention employing a projection apparatus.
Fig. 5 is a side elevational view of a detail of the apparatus shown in Fig. 4.

In Figs. 4 and 5 of the drawings I have shown an application of the concept underlying my invention to a strip film projection apparatus where the script is prepared on a strip of photographic film which is adapted to pass through the projection apparatus and be projected onto a screen. In said figures the strip film 62 is driven over a sprocket roller 63 by a motor 64 through a speed reducer 65, a driving belt 66 and a friction clutch 67, and rotation of the roller 63 is controlled in the same manner as the roller 15 herein before described by a pair of solenoids having detent controls 68 and 69. The strip film is paid out by a compound reel 70 and is guided by rollers 71, 72 and 73 over a transparent or translucent backing plate 74 having a lamp 75 within an enclosure 76 for illuminating the backing plate 74, and thence round the driving roller 63 back onto the wind-up portion of the compound reel 70. Should it be desired to advance the strip film step by step, move it continuously forward or reverse the movement thereof, a system of wiring for control of the solenoids similar to that hereinbefore described may be employed. Of course, a plurality of projection devices can be used in a manner quite analogous to that hereinbefore described. Should it be found necessary to delete any of the script from the film, the same can be accomplished by viewing the film as it passes over the backing plate 74 and the necessary deletion made on said film by means conventionally used for removing parts from the coated surface of a photographic film.

The apparatus of Figs. 4 and 5 may be suitably mounted on a stand or baseboard 77 or may be disposed at fixed locations in the television studio so that the projected script material will be visible and readable on one or more screens 78 by the performers from their respective stations, while said screens are out of direct range of the cameras. Without showing the wiring connections to the projecting apparatus or plurality of such apparatuses where used, I have, nevertheless, shown a control panel 79, by the control of the buttons 80 on which the various operations of selectively moving the strip film can be accomplished.

While I have shown and described two embodiments of my invention, it will be understood that changes in the specific constructional details of the apparatus and in the electrical wiring connections may be resorted to within the range of mechanical and electrical engineering skill without departing from the spirit of my invention as defined in the appended claims.

What I claim is:

1. A script display unit comprising a frame, a shaft journaled within the frame, a driving roll coupled to the shaft, a continuously rotatable motor, means including a friction clutch coupling the motor to the shaft, two projections affixed substantially diametrically oppositely to the shaft, two pawls pivotally arranged in the frame in position alternately to engage said projections, one of said pawls being spring loaded to a position out of reach of said projections and the other of said pawls being spring loaded to a position within reach of said projections, and separately operable solenoids coupled to said pawls.

2. A prompting system comprising a plurality of script display units, a master control unit, and flexible galvanic electrical control circuits connected between said control unit and each of said display units permitting disposition of said display units at will with respect to said control unit, each of said display units including a script driving roll, a motor, and a coupling between said motor and said roll; said control unit including a master control controlling rotation of the script driving rolls in all of said display units together and a plurality of individual display unit controls each controlling rotation of the script driving roll in one of said display units, said controls operating via said control circuits.

3. A prompting system comprising a plurality of script display units, a master control unit, and flexible galvanic electrical control circuits connected between said control unit and each of said display units permitting disposition of said display units at will with respect to said control unit, each of said display units including a script driving roll, a motor, and a coupling between said motor and said roll; said control unit including a master control controlling the couplings in all of said display units together and a plurality of individual display unit controls each controlling rotation of the script driving roll in one of said display units, said controls operating via said control circuits.

FRED H. BARKAU.

References Cited in the file of this patent

UNITED STATES PATENTS

| Number | Name | Date |
|---|---|---|
| 695,003 | Snell | Mar. 11, 1902 |
| 1,144,673 | Wheeler | June 29, 1915 |
| 1,176,691 | Ricker et al. | Mar. 21, 1916 |
| 1,493,618 | Dumont | May 13, 1924 |
| 1,590,199 | McDonnell | June 29, 1926 |
| 1,959,038 | Ridgway | May 15, 1934 |
| 1,965,906 | Pettingell | July 10, 1934 |
| 1,985,253 | Hopkins | Dec. 25, 1934 |
| 2,208,944 | Krupnik | July 23, 1940 |
| 2,291,931 | Troeger | Aug. 4, 1942 |
| 2,323,372 | Bryce | July 6, 1943 |
| 2,467,051 | Reffner | Apr. 12, 1949 |